United States Patent
Dillard

(10) Patent No.: US 9,460,458 B1
(45) Date of Patent: *Oct. 4, 2016

(54) METHODS AND SYSTEM OF ASSOCIATING REVIEWABLE ATTRIBUTES WITH ITEMS

(71) Applicant: Amazon Technologies, Inc., Reno, NV (US)

(72) Inventor: Logan Luyet Dillard, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 325 days.

This patent is subject to a terminal disclaimer.

(21) Appl. No.: 14/171,585

(22) Filed: Feb. 3, 2014

Related U.S. Application Data

(63) Continuation of application No. 12/510,212, filed on Jul. 27, 2009, now Pat. No. 8,645,295.

(51) Int. Cl.
 *G06N 3/08* (2006.01)
 *G06Q 30/02* (2012.01)

(52) U.S. Cl.
 CPC ............ *G06Q 30/0282* (2013.01); *G06N 3/08* (2013.01)

(58) Field of Classification Search
 None
 See application file for complete search history.

(56) References Cited

U.S. PATENT DOCUMENTS

| | | | |
|---|---|---|---|
| 7,216,119 B1 | 5/2007 | LaPalme | |
| 7,480,640 B1 | 1/2009 | Elad et al. | |
| 7,698,161 B2 | 4/2010 | Keil et al. | |
| 8,645,295 B1 | 2/2014 | Dillard | |
| 2002/0087388 A1 | 7/2002 | Keil et al. | |
| 2003/0204507 A1 | 10/2003 | Li et al. | |
| 2003/0217052 A1 | 11/2003 | Rubenczyk et al. | |
| 2004/0068413 A1 | 4/2004 | Musgrove et al. | |
| 2005/0021390 A1 | 1/2005 | Porter et al. | |
| 2006/0129446 A1 | 6/2006 | Ruhl et al. | |
| 2006/0277290 A1 | 12/2006 | Shank | |
| 2007/0033092 A1 | 2/2007 | Iams | |
| 2007/0143281 A1 | 6/2007 | Smirin et al. | |
| 2007/0244888 A1 | 10/2007 | Chea et al. | |
| 2008/0059281 A1 | 3/2008 | Tower et al. | |
| 2008/0059309 A1 | 3/2008 | Welch | |
| 2008/0071602 A1 | 3/2008 | Ojakaar et al. | |
| 2008/0109232 A1 | 5/2008 | Musgrove et al. | |
| 2008/0317920 A1 | 12/2008 | Bouraoui et al. | |

(Continued)

OTHER PUBLICATIONS

U.S. Appl. No. 12/510,170, filed Jul. 27, 2009, Titled: Prompting Attributes for Review.

(Continued)

*Primary Examiner* — Kakali Chaki
*Assistant Examiner* — Mai T Tran
(74) *Attorney, Agent, or Firm* — Kilpatrick Townsend & Stockton LLP

(57) ABSTRACT

Users are enabled to provide structured ratings for various attributes of items or other such content in an electronic environment. Users are able to rate existing attributes associated with an item, or new attributes that the users want to associate with the item. In addition to allowing users to provide a rating for each attribute, users can be prompted to include information relating to these attributes in reviews for the respective item(s). Attributes can be automatically applied to various items using a process that determines aspects of items that are indicative of each attribute being relevant, and automatically applies the attributes to items having at least some of those or similar aspects. Various models and algorithms are described for providing such functionality.

20 Claims, 12 Drawing Sheets

(56) References Cited

U.S. PATENT DOCUMENTS

| | | |
|---|---|---|
| 2009/0063247 A1 | 3/2009 | Burgess et al. |
| 2009/0063288 A1 | 3/2009 | Croes |
| 2009/0083096 A1 | 3/2009 | Cao et al. |
| 2009/0193328 A1 | 7/2009 | Reis et al. |
| 2010/0125484 A1 | 5/2010 | Chen et al. |
| 2010/0169317 A1 | 7/2010 | Wang et al. |
| 2011/0004508 A1 | 1/2011 | Huang et al. |

OTHER PUBLICATIONS

U.S. Appl. No. 12/510,212, Final Office Action mailed on Mar. 14, 2013, 18 pages.

U.S. Appl. No. 12/510,212, Non Final Office Action mailed on Jul. 25, 2012, 16 pages.

U.S. Appl. No. 12/510,212, Notice of Allowance mailed on Oct. 2, 2013, 19 pages.

800

```
Web Browser                                                    _ ⬜ ☒
FILE  EDIT  VIEW  FAVORITES  TOOLS  HELP
Address [                                            ] ▼ → GO
```

Create your review

How do you rate this item overall?  ☆☆☆☆☆   ☐ I own this item

| Optional: Rate this item's attributes                    ☒ |
|---|
| Overall Item Rating............☆☆☆☆☆ |
| Display Quality ...................☆☆☆☆☆ |
| Ease of Use .......................☆☆☆☆☆ |
| Battery Life .......................☆☆☆☆☆ |
| Warranty ...........................☆☆☆☆☆ |
| Reliability .........................☆☆☆☆☆ |
| Operating temperature ........☆☆☆☆☆ |
| New attribute [          ]  [ Add ] |

← 802

Please enter a title for your review:
[                                                              ]

Please enter your review:
[                                                              ]

FIG. 8

Create your review

How do you rate this item overall? ☆☆☆☆☆  ☐ I own this item

Please enter a title for your review:

Any comments about the battery life?

(1102)

Any comments about the ease of use?

Any comments about the warranty?

Any general comments?

FIG. 11

METHODS AND SYSTEM OF ASSOCIATING REVIEWABLE ATTRIBUTES WITH ITEMS

CROSS-REFERENCE TO RELATED APPLICATIONS

This application is a continuation of prior U.S. Pat. No. 8,645,295, filed on Jul. 27, 2009, titled "AUTOMATED PARAMETER MATCHING" the contents of which is hereby incorporated in its entirety by reference.

BACKGROUND

As an ever increasing amount of information about a wide variety of items become available electronically, such as from a retailer or provider over the Internet, it becomes increasingly difficult to compare and research the various items. For example, a user or customer looking to purchase a suitable toy for a toddler might want to know the ages for which various toys are appropriate. Oftentimes, a site will have one or more pictures of a toy, as well as specifications and details provided by the manufacturer or retailer of the toy. Such information is typically very objective, including information such as the dimensions and weight of the toy, but does not really give the customer a good feel for whether the toy is appropriate for a toddler, as well as whether the toy is durable or educational, etc.

In order to obtain more information about the toy, the user might use a search engine to attempt to locate reviews or other information about the toy(s) on other sites. This is a time-consuming process for the customer, and is undesirable to the retailer selling the toy because the customer is leaving the retailer site in order to obtain additional information, and might eventually purchase the toy elsewhere as a result. Further, there are thousands upon thousands of toys available, and often there is not a lot of information available for any given toy.

Various retailer sites have attempted to solve such problems by providing various forms of feedback and opinion-related options to its users. In some cases, a retailer might hire reviewers to provide reviews for certain items. This approach is costly to the retailer, and only provides a limited amount of additional information as it is limited to one person's perspective on each selected item. Many sites allow users to submit reviews for various items. These user reviews can provide a wealth of information, but can be unwieldy to parse through such that it can be difficult for a user to locate information of the type that is of interest for the user.

BRIEF DESCRIPTION OF THE DRAWINGS

Various embodiments in accordance with the present disclosure will be described with reference to the drawings, in which:

FIG. 8 illustrates an example interface prompting a user to rate various attributes for an item in accordance with one embodiment;

FIG. 11 illustrates an example interface prompting a user to discuss various attributes for an item in accordance with one embodiment;

DETAILED DESCRIPTION

Systems and methods in accordance with various embodiments of the present disclosure may overcome one or more the aforementioned and other deficiencies experienced in conventional approaches to rating and reviewing information in an electronic and/or networked environment. In various embodiments, users are able to rate various attributes of items. These attributes can be existing attributes associated with an item, or a new attribute that the user wants to associate with an item. In addition to allowing a user to provide a rating for each attribute, users can be prompted to include information relating to these attributes in reviews for the respective item(s). Attributes can be automatically applied to various items using a process that determines aspects of items that are indicative of each attribute being relevant, and automatically applies the attributes to items having at least some of those or similar aspects. Various models and algorithms are described for providing such functionality.

As used herein, the term "item" can refer to anything that can be ordered, purchased, rented, used, or otherwise consumed and/or accessed via a network request or electronic submission, such as a product, service, or system. A request can include any appropriate request sent over an appropriate system or network, such as a request submitted to a Web page over the Internet or a message sent via a messaging system to a content provider, for example. Many of the embodiments are discussed with respect to Internet-based technology and browser applications, but it should be understood that these are merely examples and that the various embodiments can be implemented in any appropriate electronic environment, using any appropriate network, hardware, and software, such as is discussed and suggested elsewhere herein. These teachings, however, are not meant to be exhaustive but merely examples of the types of components and arrangements that can be used for various portions of various embodiments, in various combinations.

Figure 1:
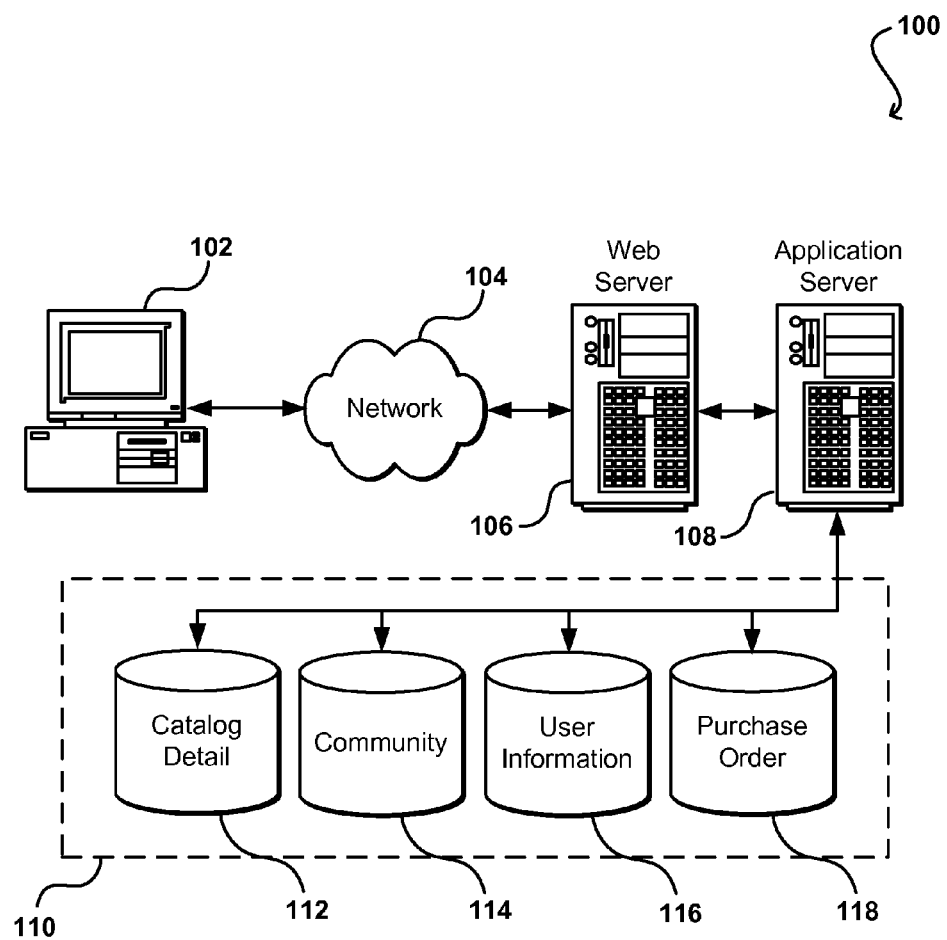
FIG. 1 illustrates a system configuration that can be used in accordance with one embodiment.

FIG. 1 illustrates an example of a environment 100 for implementing aspects in accordance with various embodiments. As will be appreciated, different environments may be used, as appropriate, to implement various embodiments. The environment 100 shown includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The environment in one embodiment is a distributed computing environment utilizing several computer systems and components that are interconnected via communication links, using one or more computer networks or direct connections. However, it will be appreciated by those of ordinary skill in the art such a the system could operate equally well in a system having fewer or a greater number of components than are illustrated in FIG. 1. Thus, the depiction of the system 100 in FIG. 1 should be taken as being illustrative in nature, and not limiting to the scope of the disclosure.

The illustrative environment further includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of html for at least one Web page using hypertext transfer protocols. The handling of all requests and responses, as well as the delivery of content between the client device 102 and the application server 108, can be handled by the Web server.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 110 can include several separate data tables, databases, or other data storage mechanisms and media for storing data relating to a particular aspect. For example, the data store illustrated includes mechanisms for storing catalog detail data 112, community data 114, user information 116, and purchase order data 118. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Figure 2:
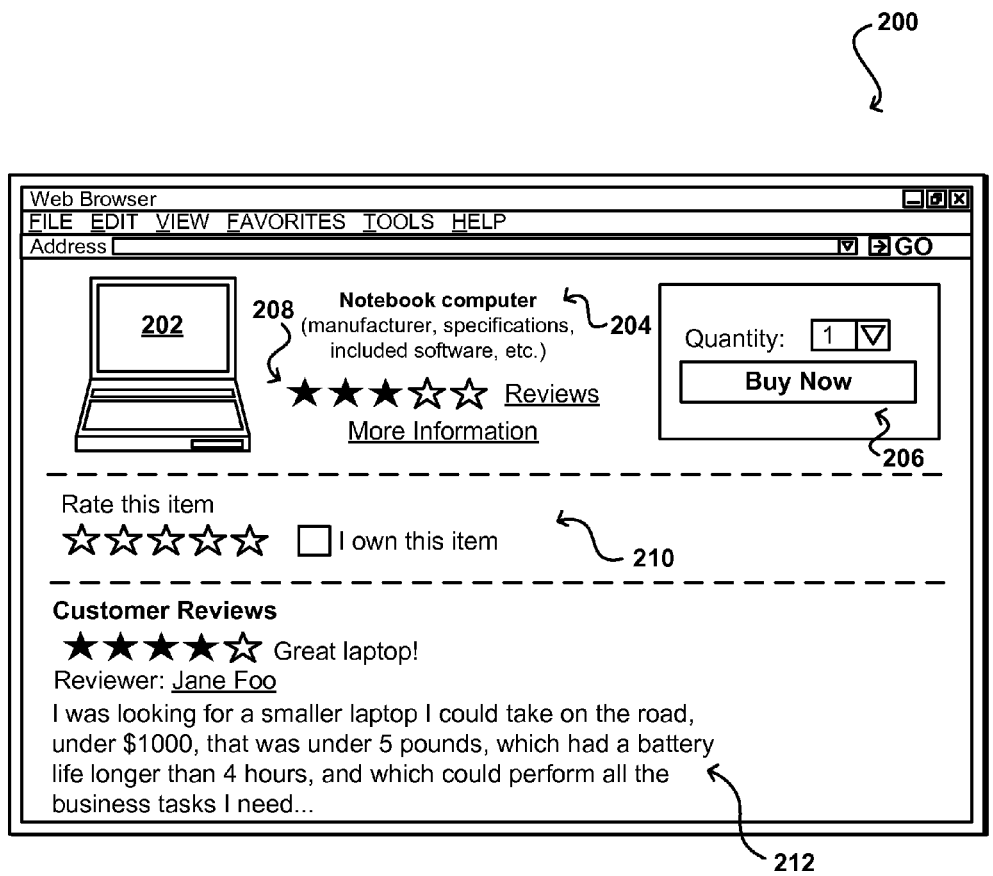
FIG. 2 illustrates an example of a user interface displaying information for an item that can be used in accordance with one embodiment.

For example, FIG. 2 illustrates a graphical user interface window 200 for a browser application on a client device, here displaying a Web page in which a user is able to view information relating to an item of interest, in this case a particular laptop. In this example, the item is being viewed in a page provided by an electronic retailer, wholesaler, or other such provider, where is displayed an image 202 of that type of laptop, item information 204 about that type of laptop, and a user-selectable purchase element 206 allowing the user to purchase the laptop (or at least place the laptop into a virtual shopping cart or shopping bag as known in the art for subsequent purchase). Mechanisms for searching and displaying inventory, managing item information, running an electronic store or marketplace, providing for user purchasing, and other related functionality are well known in the art and will not be discussed herein in detail.

Also shown in the illustrative user interface of FIG. 2 is an assortment of feedback elements representative of feedback mechanisms of the prior art. For example, the page includes a rating indicator element 208 that gives a numerical-style indication of the quality or overall worth of the item. In this case the element 208 shows that the laptop displayed has an overall current rating of three out of five possible stars. The rating can be determined in any of a number of possible ways. For example, an employee of the site can provide the rating value or another professional reviewer can provide the value. In another example, users (e.g., certain users or all users) are each able to submit their rating value, with the rating values for any given item being aggregated or averaged to determine a current rating, which can change over time as the number of rating values that is received increases. The ratings that are aggregated can vary by type of rating, as will be described in more detail below, as in some cases all user ratings might be aggregated, while in other cases only those users submitting full reviews can have their ratings aggregated for an item.

A user-selectable rating element 210 allows a user to click on a single number of stars that the user wishes to give in general to the item. In some cases, this rating is included in determining an overall customer rating for the item, while in other cases the rating is a private rating that is used only for that user, for purposes such as to suggest related or other items to the user. For example, if a user rates a first music artist consistently high and a second music artist consistently low, these ratings can be used to suggest other music from the first artist, music by artists similar to the first artist, or music purchased or rated highly by users also purchasing or highly rating the first artist, while avoiding suggesting music by the second artist and artists similar thereto. The user also be displayed an element allowing the user to indicate that the user already owns the item, in order to not be suggested that particular item.

Also displayed is a full review 212 from another user. The review can provide any information the submitting user wishes to provide, in paragraph form, and can include an overall rating provided by that user. There also can be a link or other user-selectable element that allows the user to view other reviews for the item and/or to submit a new full review for the item.

As discussed above, such feedback mechanisms are inherently limited, as a single numerical style rating does not provide any context or reason for the rating. On the other hand, the full review can provide as much context as a user wishes to submit (typically up to a limit on the number of characters), but such full reviews can be difficult for users to sort through, particularly when comparing a number of different items.

Systems and methods in accordance with various embodiments address these and other such deficiencies and aspects by, among other techniques, providing users with the ability to view, search, submit, and/or otherwise utilize various types of criteria-based structured ratings and feedback mechanisms for items presented in an electronic environment, such as is described above with respect to FIG. 1. Users can have the ability to select any criterion or attribute about an item and submit a rating for that attribute. Further, users can be prompted to include information about these attributes in their reviews, which can help to provide content for the specific ratings. Examples of such attributes include, for example, the educational value, durability, and fun of a toy; the service and coverage for a wireless device; and food quality, ambiance, and perceived value for a restaurant. When writing a review for an item, a user also can be prompted to rate various attributes about the item. Information for various items can be analyzed, and attribute information can be propagated to item with similar properties that are indicative of the applicability of the attribute to the item.

While FIG. 2 presents an example where customer reviews for an item can be displayed to a user, the ratings by each customer are only for the item in general. In order to obtain any context for the rating, the user must read or at least search through all the reviews, which might be displayed over several pages of information and thus difficult to search. Further, there might be several ways of conveying similar information, such that a user might have to search using several different words, terms, or phrases in order to attempt to locate the information for which the user is searching.

Figure 3:
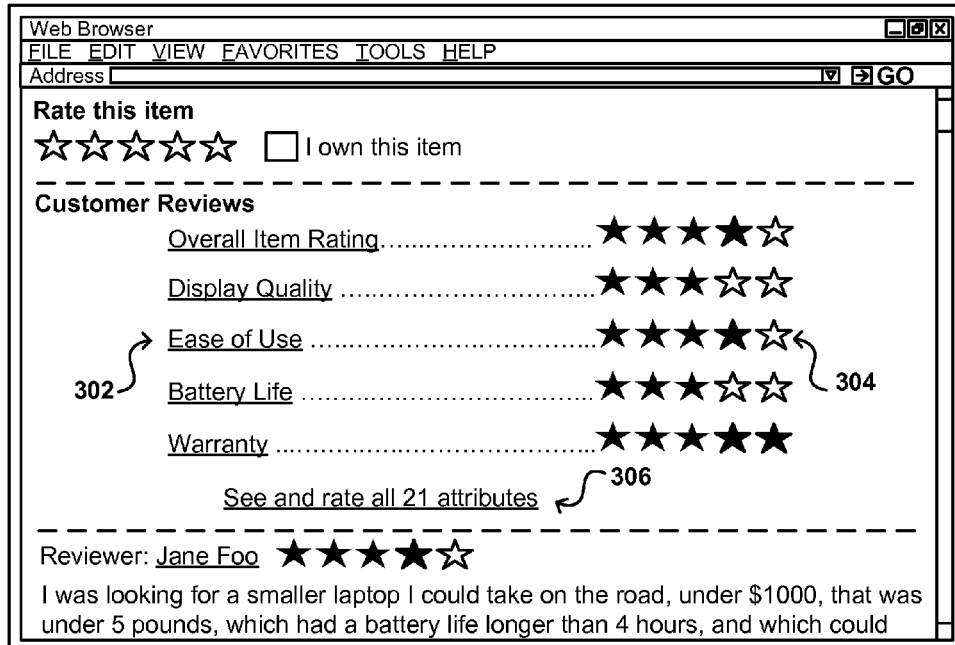
FIG. 3 illustrates an example interface displaying structured ratings for an item in accordance with one embodiment.

FIG. 3 illustrates an example user interface 300 in a browser window showing attribute-specific feedback information and/or structured ratings in accordance with one embodiment. As with the example of FIG. 2, information such as an image, title or name information, and data or other information about an item can be displayed, along with options to purchase the item, write a full review, or provide a general rating for the item. Illustrated in this example, however, several attributes 302 are listed for the item, along with a rating 304 for each attribute. Each attribute listed can correspond to an aspect, feature, or other such information that is somehow related to the item. The displayed attribute is shown as a link, such that a user can interact with the link to obtain information about the attribute or go to a specific page or window with information about that attribute. Because there can be many attributes rated for a specific item, it might be undesirable to list all attributes on a general detail page for the item. Accordingly, a link 306 or other such element can be included that enables a user to have information relating to additional attributes displayed, instead of a fixed number or other selection of the attributes.

Figure 4:
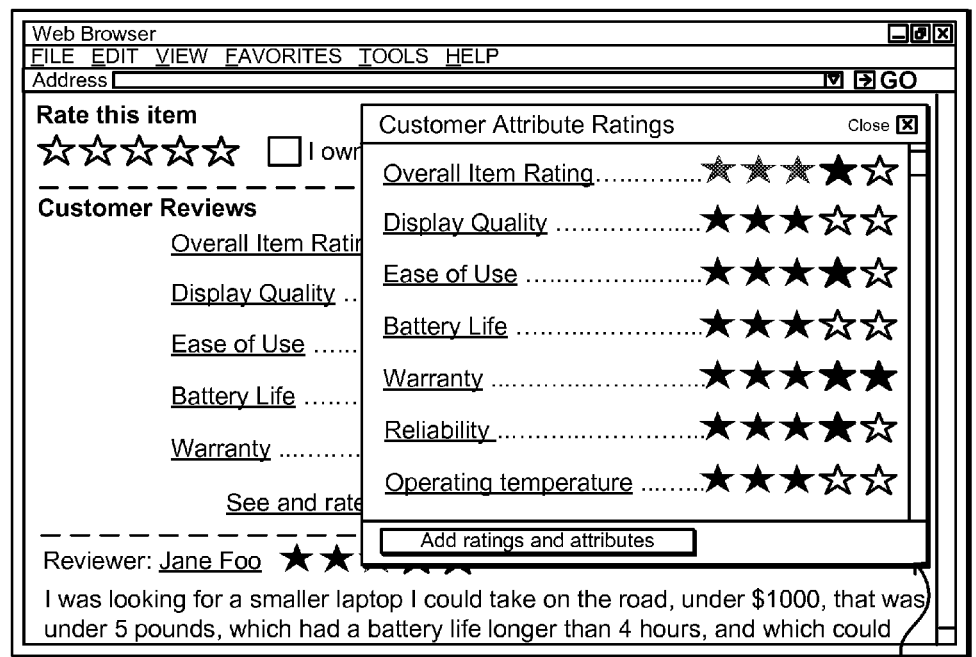
FIG. 4 illustrates an example interface displaying structured ratings for an item in accordance with one embodiment.

FIG. 4 illustrates an example display 400 wherein, in response to a user interacting with the additional attribute element, for example, an additional display 402 is presented that includes additional attributes and/or structured ratings for the item. In this example the additional display is a modal window that floats above the current window as an additional layer, but it should be understood that any new window or interface, or portion of the same window or interface, can be used in various embodiments. In this example, the additional display 402 includes all the attributes and structured ratings for the item, which can be accessed by scrolling or otherwise manipulating a viewable portion of the display, although portions of the attributes and ratings can be presented in various embodiments. In this way, a user can quickly scroll through the attributes, including aggregated ratings from multiple users, in order to get a better overview of specific aspects of the item. For example, the user might see that this item has a four star rating, but if the user is looking for a laptop with a better than average battery life, the user can quickly see that users have rated the battery life with only three stars. Thus, if battery life is a primary concern for the user, the user might select an item with a lower overall rating but a higher battery life (or other specific attribute(s)) rating. Presenting only a single overall rating as in conventional systems would not provide this level of information in an easily-accessible and understandable fashion.

Simply listing the ratings for the various attributes, however, may not provide a sufficient level of information for all users in all cases. For example, in the previous example the warranty was rated at five stars, but a user cannot tell if this is because the warranty is a full warranty for a long period of time such that it is worth the expensive warranty-specific price, or if the received warrant attributed received a five star rating because the warranty is free, even though it is a very limited warranty. Further, the reliability is rated at five stars, but it is not easy to determine whether most users thought the item was generally reliable, or if 20% had an item failure.

Figure 5:
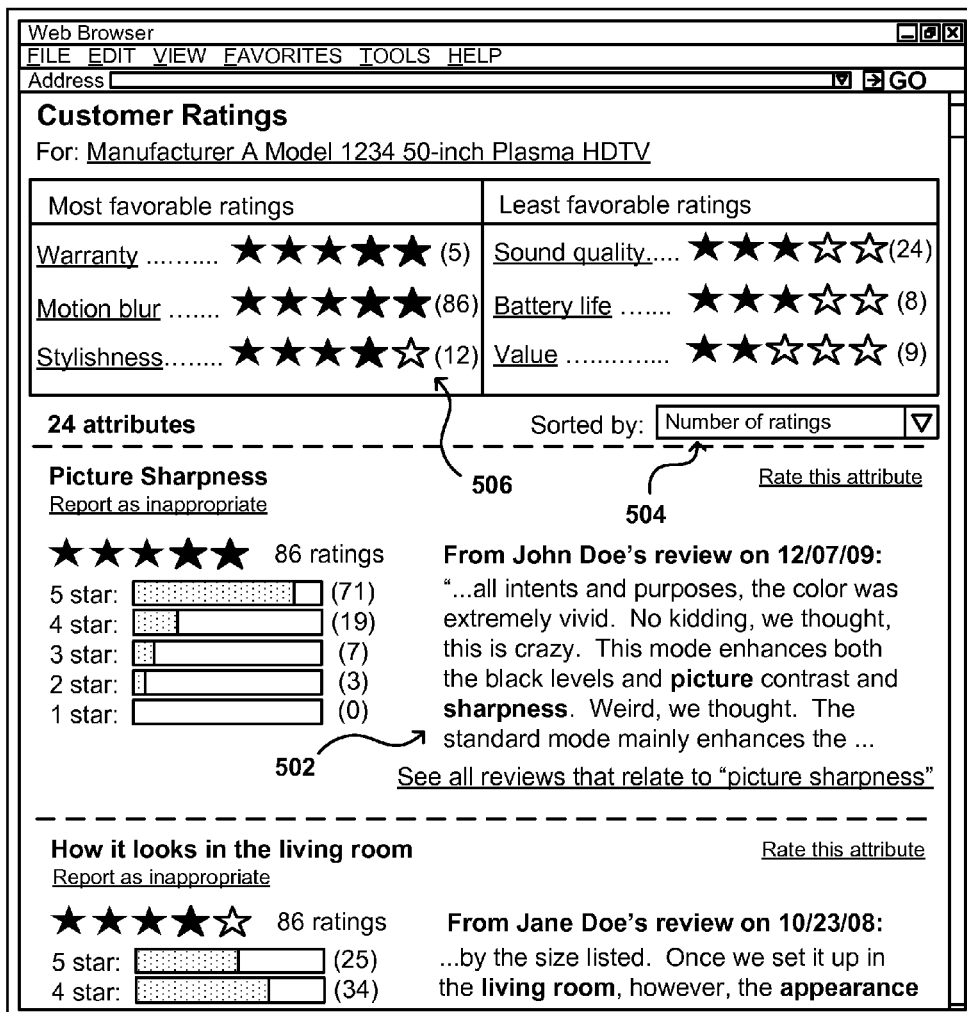
FIG. 5 illustrates an example interface displaying structured ratings and relevant information in accordance with one embodiment.

Thus, it can be desirable to provide at least some level of context for the specific ratings. In one embodiment, information relating to the attribute is displayed along with the rating, in order to help the user understand the meaning behind the rating. For example, FIG. 5 illustrates an example display 500 wherein information available for the item that relates to the attribute can be displayed along with the rating. In this example, item reviews posted by users are automatically searched for terms relating to the attribute, and portions 502 including those matching terms can be displayed to the user. Various other sources of information can be used as well, such as third party articles or reviews, product descriptions, etc. For example, posting image quality details from a product review might provide information that is useful to a user viewing an attribute such as "picture sharpness". As mentioned, similar terms also can be used to search for information. In the example for the attribute "how it looks in the living room", a review with the terms "living room" and "appearance" within a given word spacing can appear in the search results as being related to the attribute. A portion of the information around the term can be displayed, and the matching terms can be highlighted, bolded, or otherwise identified. The user can have the ability to view the full review, read other matching reviews, or perform other such activities in various embodiments. The user then can have some context as to the meaning of the rating provided for the attribute.

As seen, the user also can have an option 504 to sort the attributes by various criteria, such as the number of ratings, type of rating, rating value (e.g., high to low), or other such criteria. As shown, other configurations can be used to convey information that might be desirable to a user. In this example, a table is displayed that includes a number of the highest and lowest rated attributes, such that a user can quickly determine and/or compare the strongest and weakest features of the item. In some cases, a user viewing search results for an item can sort the search results by an attribute as well, such as by sorting the results by battery life, value, or any other such attribute.

Figure 6:
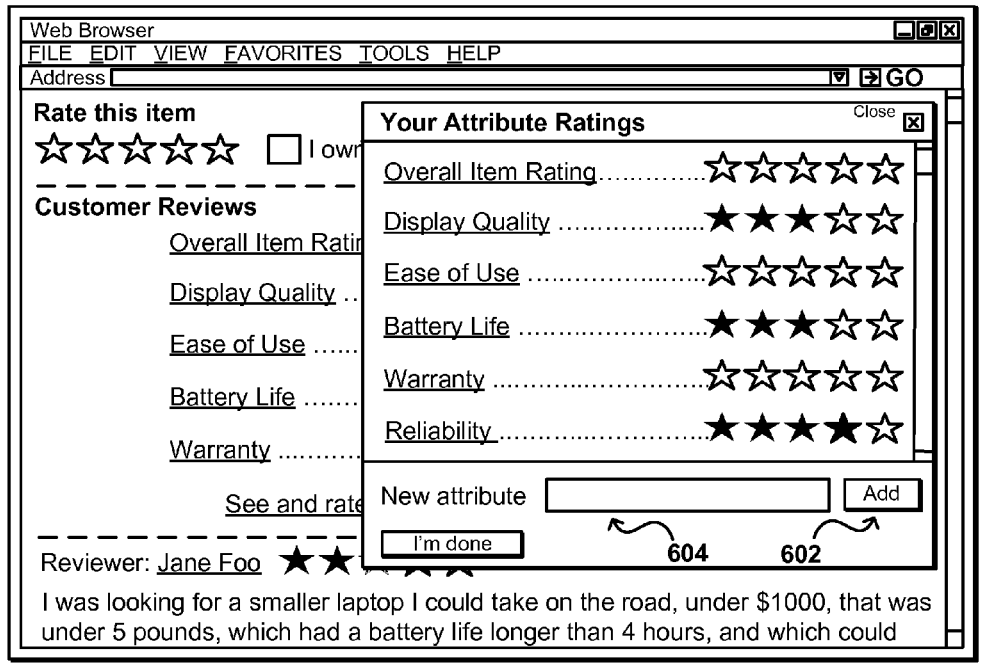
FIG. 6 illustrates an example interface prompting a user to rate various attributes for an item in accordance with one embodiment.

In addition to viewing attribute ratings provided by other users, a user also might wish to provide a review and/or ratings of various aspects of an item. As illustrated in the example display 400 of FIG. 4, a user can be presented with an option to provide his or her own attribute ratings. Upon selecting such an option, or upon entering an overall rating for the item, etc., a user can be presented with a display 602, such as a modal window or other such display as illustrated in the example of FIG. 6, wherein the user can provide a rating for one or more attributes for the item. In this example, providing a rating can be as simple as clicking on, or otherwise selecting, the rating that the user wishes to provide for an attribute. In this case, if the user wishes to provide a rating of four stars for an attribute, the user can simply click on the fourth star from the left. Various other options can be used as well, such as entering a number from one to ten, moving a dial on a virtual meter, sliding a rating bar, or using any other such element.

In some cases, a user might wish to provide feedback for an attribute that is not currently associated with an item. For example, if a camera uses a specific type of memory card and not commonly used storage media, a user might wish to give a low rating for a storage-related attribute. In the example of FIG. 6, the user can have an option 604 to simply type in or otherwise enter a new attribute. In some embodiments this will bring up a new window, where the user can provide a rating for the attribute. In other embodiments, the user can provide a rating along with the new attribute, which can be submitted at substantially the same time. For example, the user could enter a term such as "storage media" to enter a rating for that attribute or aspect of the item.

A potential downside to letting a user freely enter attributes, however, is that several attributes could be entered that address the same general aspect, but that could prevent the data from being aggregated in a meaningful way. For example, one user could enter the attribute "sharpness" for the quality of a display, while another user could enter the term "fuzziness" and another user could enter the term "clarity". For certain items, these can essentially all relate to a similar aspect of the display, but using different terminology. Thus, it could be beneficial in some embodiments to attempt to normalize or standardize the attributes such that ratings for similar aspects can be aggregated, and that fewer attributes are available such that a user can more quickly locate desired information.

Figure 7:
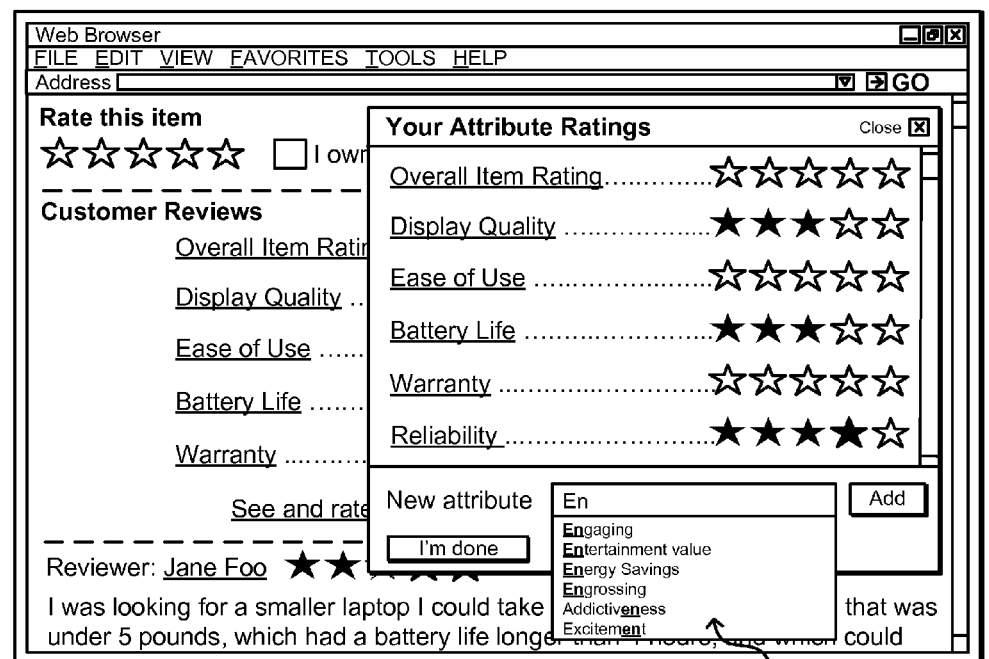
FIG. 7 illustrates an example interface including an auto-complete feature for assisting users in adding attributes that can be used in accordance with one embodiment.

A system in accordance with one embodiment provides an "auto-complete" or "suggestion" option 702, such as is illustrated in the example display 700 of FIG. 7. In this example, when a user starts typing or otherwise entering information for a new attribute, the system can analyze existing attributes and attempt to suggest those attributes. For example, if a user starts typing one or more letters, the system can display attributes that start with, or include, those letters. The system thus can attempt to canonicalize or normalize the attributes, such that the presence of similar attributes such as "ease of use" and "easy to use" can be minimized. These suggestions can be ranked using any appropriate criteria, such as popularity or applicability to the present item. In other cases, the system can attempt to determine any attributes that might be similar in subject matter to an attribute being entered. Using the example above, if a user started typing the first few letters of "fuzziness", the system could suggest "sharpness" even though the letters are substantially different, as the attribute can be determined to be a likely alternative to the term being entered by the user. Various other approaches for suggesting attributes can be used as well using term matching and relevance algorithms known or used in the art. In some cases, certain attributes also can be forbidden. Attributes might be forbidden or blacklisted for any number of reasons, not simply due to the presence of inappropriate language or other such reasons. For example, an attribute such as "design" can be blacklisted as being too ambiguous. For example, the "design" of a product might be great for one user as the user appreciates the large size, but another user might rate the design poorly as the item is too large. Thus, a five star rating for design could mean something completely different for different users, and thus could be avoided. In some embodiments, the system might suggest alternatives in the auto-complete box. In other cases where the user attempts to submit such an attribute, the system can display a message or other indication that other attributes might better express what the user is trying to convey, such as "size" or "appearance", and the user can be able to select from among these options or try another attribute. Various rules can be applied to determine when to suggest alternative attributes, as well as which to apply. In some cases the alternatives can be applied manually, while in others a learning algorithm can be used that builds off of a number of manual entries similar to other processes discussed herein.

In some cases, a user might simply select an option to review an item. In order to attempt to obtain additional information, a display 800 presented to a user attempting to submit a review can include a section 802 directing the user to rate specific attributes, in addition to providing a section 804 where the user can type in or otherwise enter a review for the item, such as is illustrated in the example of FIG. 8. Here, a set of attributes is listed at the top of the review page, such that a user can easily rate one or more attributes as part of the review process. The user also can have an option to enter a new attribute, or other options as discussed elsewhere herein.

In order to add further value to the use of such attributes, it can be desirable in some systems to prompt the user to include information in reviews or other such comments that relate to one or more of these attributes. Prompting the user to write about specific topics can help reviews in general to be more informative, as the ability to convey information in a concise and clear way can vary widely among users. For example, instead of a user writing "This product is exactly what I was looking for," which may not mean much to anyone other than the user posting the review, it could be preferable to get the user to write about specific aspects, such as the speed, ease of use, etc. Further, prompting the user with specific topics might get the user to think about aspects of the item that the user might not otherwise consider to include in a review. For example, user might not have thought about the battery life of an item, but upon seeing the topic might realize that the battery life is actually very good based on the usage of the device by the user.

Figure 9:
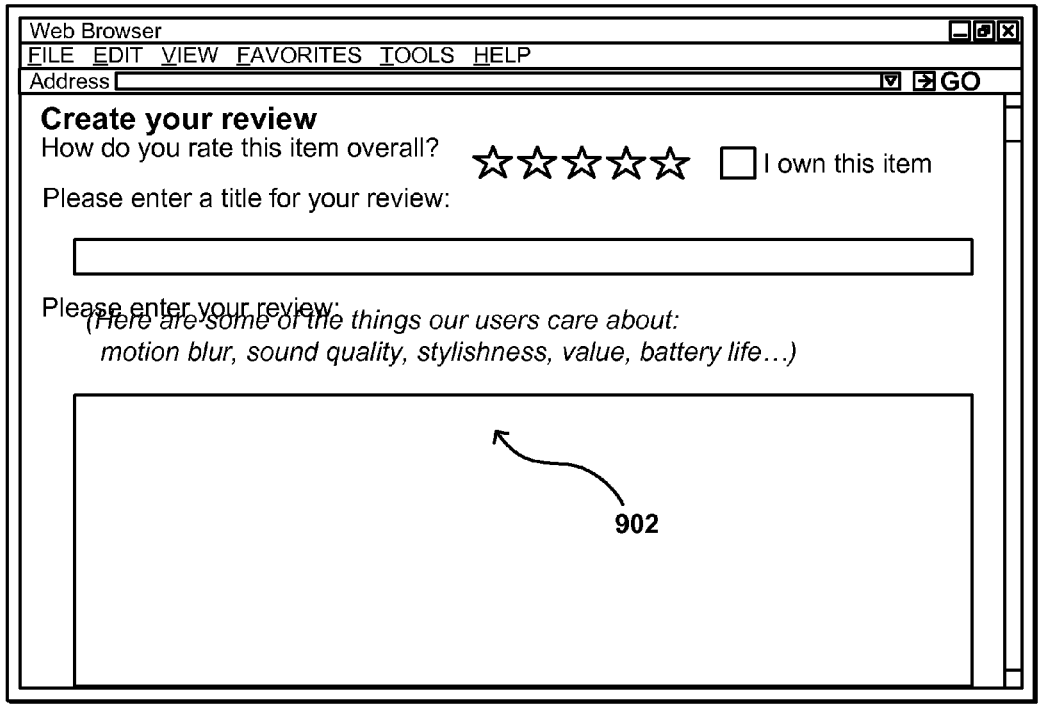
FIG. 9 illustrates an example interface prompting a user to discuss various attributes for an item in accordance with one embodiment.

FIG. 9 illustrates an example display 900 that can be used in accordance with one embodiment. In this example, a user is presented with a text box or similar element enabling the user to enter text and/or other information for a review. As part of the display, the user can be presented with information 902 that other users might care about for the item. In this example the information is presented in a single sentence, but it should be apparent that the information could be displayed as part of a list or other such display. In many cases there can be too many attributes for an item to include or use to prompt the user. In some embodiments, the system can select a number of attributes to display to the user. In some embodiments the system will determine the top attributes based on the number of reviews per attribute, so as to display attributes that are of interest to the most users. In other embodiments, the system might include at least some attributes with very few ratings in order to obtain additional data points. In still other embodiments, the system might rotate the attributes displayed in order to attempt to get data for all relevant attributes. The system or service might also select attributes to display based on an other appropriate information, such as user data, user historical information, geographical information, or seasonal data. Any appropriate criteria can be utilized to select attributes in accordance with the various embodiments. Various other such approaches also can be used as well as should be apparent in light of the teachings and suggestions contained herein.

Figure 10:
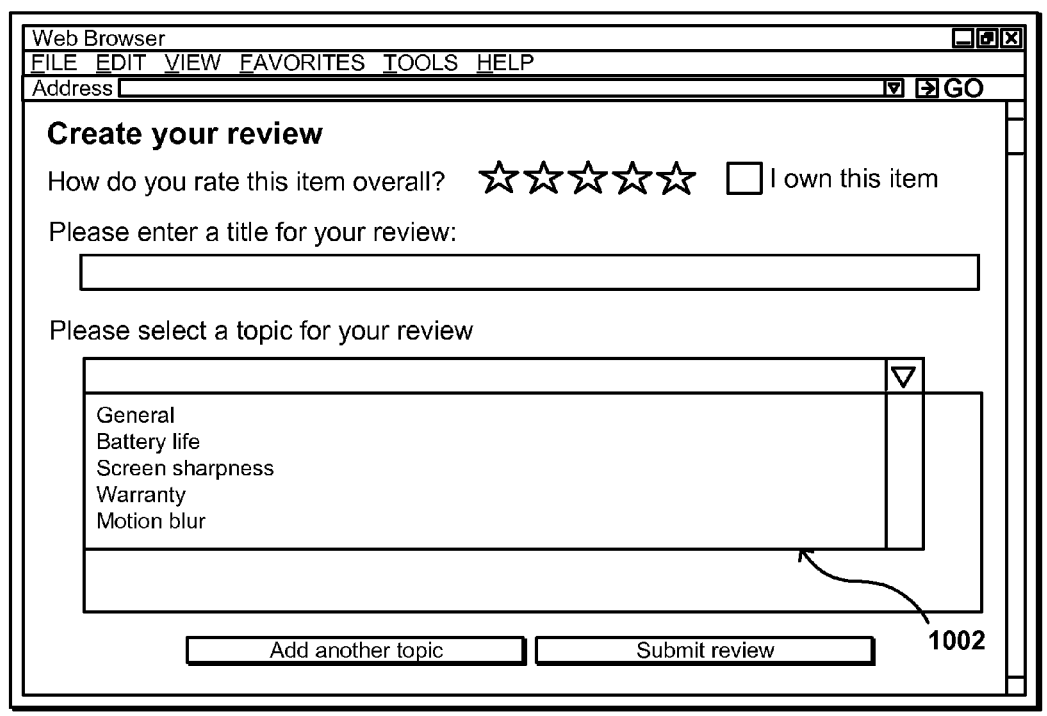
FIG. 10 illustrates an example interface prompting a user to discuss various attributes for an item in accordance with one embodiment.

FIG. 10 illustrates another example display 1000 wherein a user is prompted to enter topic- or attribute-specific information in a review of an item. In this example, the display includes a drop-down menu 1002 or other such element that allows a user to select one or more topics to be included in the review. If the user simply wishes to provide a general review, a "general" or similar topic can be selected by default such that the user can simply type in or otherwise enter a review. If the user wishes to provide review information for at least one topic, the user can select the topic and enter the topic-specific information. A user can have the ability to enter information for any or all of the topics or attributes, as well as a general review. Simply seeing the list of topics might help to prompt the user to include specific information in a review. If a user provides comments related to a specific attribute, that information can be tagged for subsequent display with that attribute. Otherwise, the information in the general or other reviews can be searched as in other embodiments and matching text can be displayed. FIG. 11 illustrates another example display 1100, wherein specific text boxes 1102 or other such fields or elements are displayed to a user as possible places for entering information. As discussed, the system can select a set of attributes to use to prompt the user, and this page of information can be generated dynamically to include elements for each of the selected attributes, as well as a general entry field. Various other combinations and variations can be used as well. For example, a field for the review can also utilize an auto-complete function to attempt to standardize the words used in reviews from different users.

Figure 12:
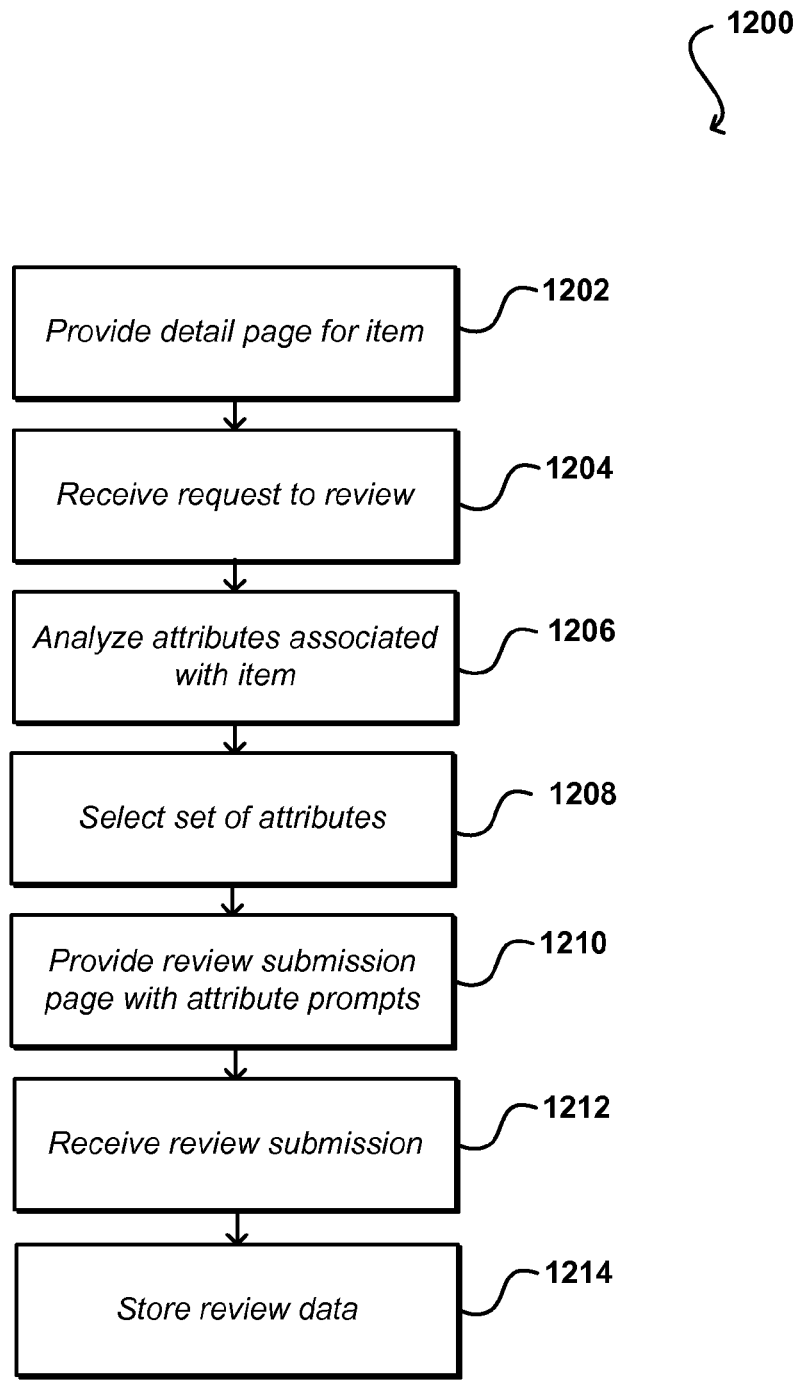
FIG. 12 illustrates an example process for prompting a user to include attribute-specific information in a review that can be used in accordance with one embodiment.

FIG. 12 illustrates en example process 1200 for prompting a user with topics for a review that can be used in accordance with one embodiment. In this example, a page of information for an item is provided to be displayed to a user 1202. Often the page will be provided in response to a request from a user, such as a request for a specific page resulting from a user following a hyperlink or other selectable element presented due to the user browsing or searching for content. The page can include a user-selectable element enabling the user to request to submit a review for at least some aspect of the item, and the system or service can receive the request to enable the user to provide the review 1204. In response to the request, the system can analyze the attributes associated with the item 1206 and select a set of attributes to be provided to the user 1208. As discussed above, this can involve a single or multiple systems or services, at least one of which can extract the attribute data for the item from a data store or other such location and utilize one or more algorithms or processes for selecting at least a subset of the attributes, such as the most often rated attributes. Information relating to the selected set of attributes can be included in a page provided for display to the user, where the page prompts the user to include information for one or more of the attributes in a review to be entered by the user through the provided page 1210. When the user completes and submits the review, information for the review is received 1212 and the information can be stored to a data store 1214 or other such location for later search and/or extraction with respect to a review or attribute.

It should be noted that in at least some embodiments a user must at least be logged in to the system (or otherwise identified or authenticated to the system) in order to submit feedback for an item. Requiring a user to first be authenticated and/or authorized provides some control over persons wishing to skew the results for an item, such as to make one item appear better than another or submit fake or fraudulent feedback. In some embodiments, a user must have made at least one purchase through the system in order to obtain the privileges to submit feedback. In some embodiments, a user can have an associated "reputation" as known in the art, which allows other users to tag, flag, or otherwise submit feedback for the user when the user does something inappropriate, for example. In such cases, a user might also have to have a minimum reputation level before being able to leave feedback. In some cases, a user with less than a minimum reputation level might have to have any new submissions reviewed before those submissions are posted to the Web site. Further, a user might have voting privileges taken away in response to certain actions, such as submitting inappropriate content or threatening another user. There are a number of security, authentication, identification, rights management, and other such approaches that could be used as would be apparent to one of ordinary skill in the art in light of the teachings and discussion contained herein.

When a new attribute is entered, a process can be executed to determine whether the attribute is inappropriate or otherwise should not be displayed for the item. For example, a workflow can be kicked off that calls various processes or services that each check, analyze or process a particular aspect of the submission received from the user. In one such flow, a submission is first checked using an appropriate algorithm, heuristic, etc., to determine whether the feedback is duplicative of existing feedback for that item and/or criterion. This can involve applying rules, policies, or business logic to the submission, in order to determine whether the submission is an exact duplicate of another submission, or is potentially duplicative. If the submission is determined to be duplicative, any rating for the submission can be aggregated or otherwise combined with the other attribute covering that aspect. A process also can examine the submission to determine whether the submission contains inappropriate language. This can be done by checking the content of the submission against a library of words or phrases determined to be inappropriate, or using any other such process known or used in the art to detect such language. Another process can attempt to detect bias of the user. For example, a process could examine all feedback left by a user, and if it is determined that that user always leaves negative feedback for one company's items and positive feedback for another company's item, then that user's vote can be flagged by the system as being potentially unreliable or otherwise inappropriate. Methods for detecting bias are well known in the art and will not be discussed herein in detail.

There also can be any of a number of other such processes applied to the submission to determine whether to accept, aggregate, and/or display the feedback. Checks also can be run on the user at this time, such as to determine whether the user has submitted an excessive amount of feedback, whether the user rating has dropped below a minimum threshold for leaving feedback, whether a user session has expired, etc. Other known processes can be run to process submissions, such as spell-checking and grammar-checking processes. In some cases, detected problems with spelling and grammar can be corrected automatically, otherwise the submission can be flagged as being potentially problematic for later manual review. If none of the processes determine a potential problem with the submission, then the feedback can be stored for subsequent aggregation and display with the item. If any of these processes determine that the submission received from the user is potentially inappropriate, or if there is any aspect of the submission that might keep it from being accepted and/or used as feedback for the item, the user can be prompted to alter the feedback submitted.

A system can process a new attribute in any of a number of ways. First, the system can automatically accept and store the new feedback and present the feedback with the item information in any of ways described or suggested above. In another approach, such a submission can be flagged or otherwise queued for review by an authorized person before being allowed to be stored and used as feedback. A number of ways for storing content for approval before allowing the content to be accessed are well known in the art and will not be discussed herein in detail.

If the feedback is stored and access is provided without internal review, for example, a user subsequently viewing that feedback can be provided with the ability to report or flag the feedback. For example, FIG. 5 illustrates an example of a reporting element displayed with the attributes that allows a user to flag an attribute as being potentially inappropriate. In some embodiments, there can be an option that also allows a user to select from a drop-down box or similar type element to submit a reason why the user believes the statement contains inappropriate content or should otherwise be reviewed. The user could select a reason and select a "submit" or similar element, although the selection itself could trigger the submission, and a corresponding request can be submitted to the system or application. In response to such a request, the reported feedback can be removed from the item information right away, or can simply be flagged for review while maintaining the ability to be displayed or otherwise accessed. If the feedback is removed, it still can be retained for review without being deleted. An administrator or other such person then can have the option to review the request and determine whether to allow the feedback to remain, delete the feedback, or store the feedback and simply not provide access or the ability for the feedback submission to be displayed.

Approaches such as allowing users to report inappropriate or other such content help to ensure that useful content is easily accessed by a user. Further, since the feedback displayed can be sorted so that the questions or statements with the most responses are presented first, any user-submitted questions or feedback that are not utilized by the "community" will fade toward the bottom of the displayed feedback and will not get in the way of a user attempting to find what the community implicitly determines to be more important or useful. In some systems, a question or statement that exists for a certain period of time (such as a year) without any feedback other than that submitted by the originating user may be removed or deleted in order to attempt to ensure that only the most useful information is displayed. In other embodiments, each question or statement might have a voting option such as "Was this helpful?" or "Would this information be of use to anyone?", whereby a number or percentage of negative community votes can result in the content being removed. Approaches to submitting and utilizing such feedback are well known in the art and will not be discussed in detail herein.

Another way to provide useful feedback to users is to allow certain users to have their feedback weighed more highly than other users. In some systems, a user that meets a certain requirement such as a minimum community rating score, a minimum number of reviews, or any other such requirement or threshold can be determined to be a higher level user than other users. In such a case, any feedback submitted by such a user might be presented more prominently in the feedback sorting as the feedback is more likely to be reliable and/or of interest to the average user. For example, the expert user feedback can be listed separately, or at the top of a list of results. There can be many other approaches as could be appreciated, however, such as listing with the responses how many experts voted for that response, displaying something such as "(103)" for the total number of users submitting a rating and "2 expert users" next to the total number. In other embodiments where percentages, graphs, histograms, or other such elements are used to display rating results, a rating of an expert user might be weighed more than that of an average user. A user might also be able to see all feedback left by an expert, such as to get a better feeling of how the expert's opinions might match up with the user's opinions, or determine exactly how much of an "expert" the expert user can be considered. In some systems feedback left by any other user also can be made available. A user also can have the option to review all feedback left by that user.

In addition to implementing ways to attempt to more prominently feature feedback determined to be more useful to average users for any given item, systems and methods in accordance with various embodiments also can allow users to compare items based on the attributes, as discussed herein. For example, a user might be able to search for items that have feedback for a certain attribute. A user might be able to not only enter keywords or a category in a search engine, but might also be able to select or enter an attribute on which to search. For example, if the user is viewing a search page for toys, and wishes to find toys that are appropriate for a toddler, the user might have the option to select or enter such information in an attribute section element, which can present results where feedback has been submitted relating to whether the elements is suitable for a toddler. In other examples, a search engine might accept an entry from a user submitting keywords such as "good for a toddler" in a search term element, and instead of simply searching for keywords in a search index might also determine whether any attributes and/or structured ratings match, and might also present those items in the search results.

A potential problem to relying on users to provide attributes and ratings for an item, however, is that new items, categories, stores, or other such elements or groupings can initially be presented without any attributes associated therewith. While in some cases a default set of generic attributes can be applied for certain categories, or attributes can be applied manually for a limited number of items, such approaches do not ensure that the attributes applied are well suited for a large number of items. For example, "battery life" might be applicable for wireless computer accessories but not "wired" computer accessories. For a large number of accessories, it can be undesirable to attempt to manually go through each item and determine whether each attribute is applicable or not. Accordingly, it can be desirable in many instances to determine a way to propagate attributes out to various items, categories, etc., based upon parameters or other aspects that are indicative of the applicability of the attribute(s).

Systems and methods in accordance with various embodiments can utilize one or more algorithms for analyzing aspects of items, categories, etc., to attempt to determine attributes that are relevant to a specific item, category, etc. These algorithms can be used to perform actions such as applying attributes to a new item or propagating new attributes to existing items, as well as many other such actions. It should be understood, however, that the term "algorithm" is used for purposes of explanation, and is not meant to be interpreted as being limited to a mathematical algorithm, but is instead meant to cover any appropriate process or procedure that can accept and analyze various inputs and output a result as discussed and suggested herein.

In one embodiment, various items are selected to have a number of attributes applied manually. For example, if an online retailer begins selling cameras, the retailer might apply attributes to a dozen of these cameras in order to serve as a "seed" for propagating out the attributes to similar items. In some embodiments, a system might analyze information for the new cameras and attempt to predict attributes that might be useful. These attributes then can be analyzed for appropriateness and/or relevance. In one embodiment, an item administrator might review the attributes and approve, disapprove, or alter each of the attributes. In other embodiments, the proposed attributes can be sent along with information for the item to a human intelligence system, which can provide the attributes and information to a set of workers who each input whether or not the workers think the attributes are relevant. Various other such approaches can be used as well within the scope of various embodiments.

For example, the retailer beginning to offer cameras in a particular store might select to associate attributes with a set of items in the camera store, such as to associate attributes such as "battery life" and "picture quality" with a specified number of cameras. Attributes such as "battery life" may not simply be added to every item in the camera store, however, as many camera accessories do not require batteries, and even some film-based cameras without flash do not use batteries. Thus, a manual application of attributes to a set of items can be performed using one of the processed discussed or suggested herein. Systems and methods in accordance with various embodiments can process attributes applied to various items in order to attempt to determine information about the item that is indicative of that attribute being relevant, and that can apply that attribute to other items having the indicative information, either in a particular category or in any category. This process can be performed at any appropriate interval, such as daily or weekly, or can be performed at any time as directed by an administrator or other authorized user, such as after a set of manual attributes are applied in order to seed other items in the electronic catalog.

Figure 13:
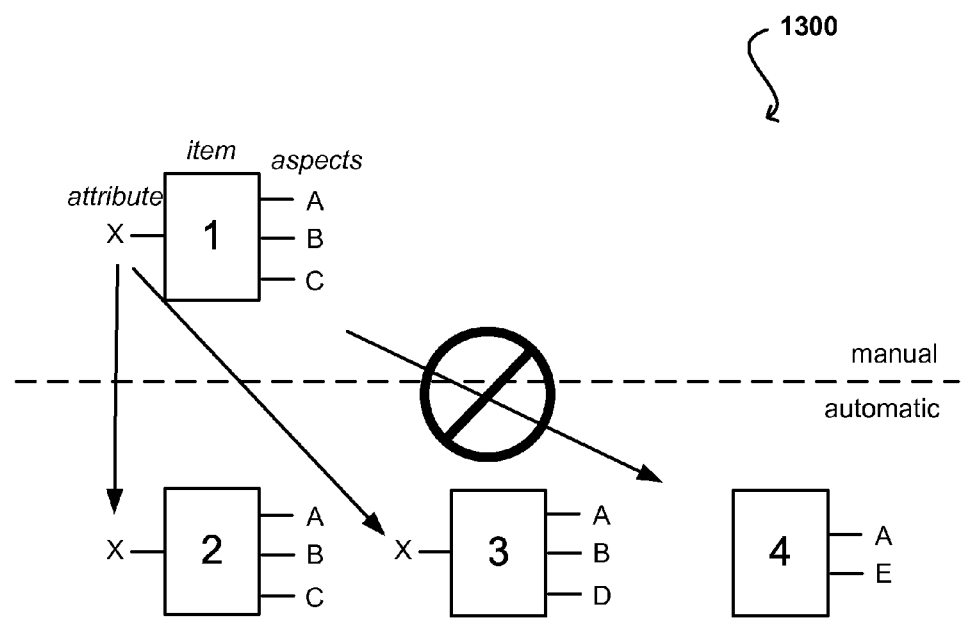
FIG. 13 illustrates an example for associating attributes with items in accordance with one embodiment.

FIG. 13 illustrates an example 1300 that can be analyzed in accordance with various embodiments. In this example there are four items, referred to as Item1, Item2, Item3, and Item4. In this example, Item1 has an attribute X applied manually. Item1 also has three aspects or characteristics (A, B, and C) that are determined to be indicative of attribute X. During an attribute association process, the aspects of Item2, Item3, and Item4 can be analyzed. In this example Item2 has all three aspects A, B, and C that are indicative of attribute X, so attribute X can be mapped, applied, or otherwise associated with Item2. Item3 has aspects A and B only, and also has aspect D which is unrelated to attribute X. Based on this information, the algorithm might decide that the likelihood of attribute X being applicable to Item3 is great enough that attribute X can be mapped to Item3. Item 4 only has aspect A, and also has aspect E, which is indicative of attribute X not applying to Item4. As such, the algorithm likely could determine that there is not a strong enough association to automatically associate attribute X with Item4.

Various embodiments utilize one or more machine-learning algorithms to determine which aspects, features, or information about an item makes each assigned attribute relevant to a particular product. For example, a camera having specifications for a "battery" in a product description might be indicative of the "battery life" attribute being applicable. A pipeline, service, or set of system resources can collect, store, and/or retrieve information regarding all, or a least a portion, of the available items and any or all attributes assigned to those items. The algorithms can accept the information and attributes, and automatically attempt to determine what is indicative of a particular attribute. The same or additional algorithms also can be used to associate attributes with items having features, aspects, or information that is indicative of those attributes. Further, the process can be performed iteratively in order to improve results. For example, a single pass over the products might associate an attribute "battery life" with any item having a specification for "battery". If during the learning process, however, it is determined that items having a phrase such as "external battery required" is indicative of the attribute not applying to certain items, then a subsequent pass over the items might remove this attribute where the attribute was originally determined to apply to items based on the term "battery". In some cases, a minimum number of data points must exist for an association before an algorithm or model considers that association, so performing iterative analysis enables additional data points to be determined and additional associations to be used. In some embodiments there is a fixed number of iterations. In other embodiments, the number of iterations depends on a level of change between iterations, such as where the processing will stop once less than 1% of the attributes change between iterations.

In some embodiments, the data analysis portion is a separate system or service from the system or service that actually provides the structured ratings in response to content being accessed by a user, such as via a Web site or other electronic interface. Once the attributes are determined and/or associated with specific items, that information can be stored or persisted to an appropriate data store, data storage service, or other appropriate location. If a structured ratings service has access to the data store, the service can simply access the updated data. If not, updated mappings or other associations can be sent to the structured ratings system or service, such as where the service is offered by a third party. In some embodiments, the analysis portion will determine only those aspects which are indicative of attributes, and then the structured ratings system will associate the attributes with items based on those aspects. In other embodiments, the analysis portion associates the attributes with the items, and the associations are provided to the structured ratings service. Various other combinations and variations are possible as well.

Figure 14:
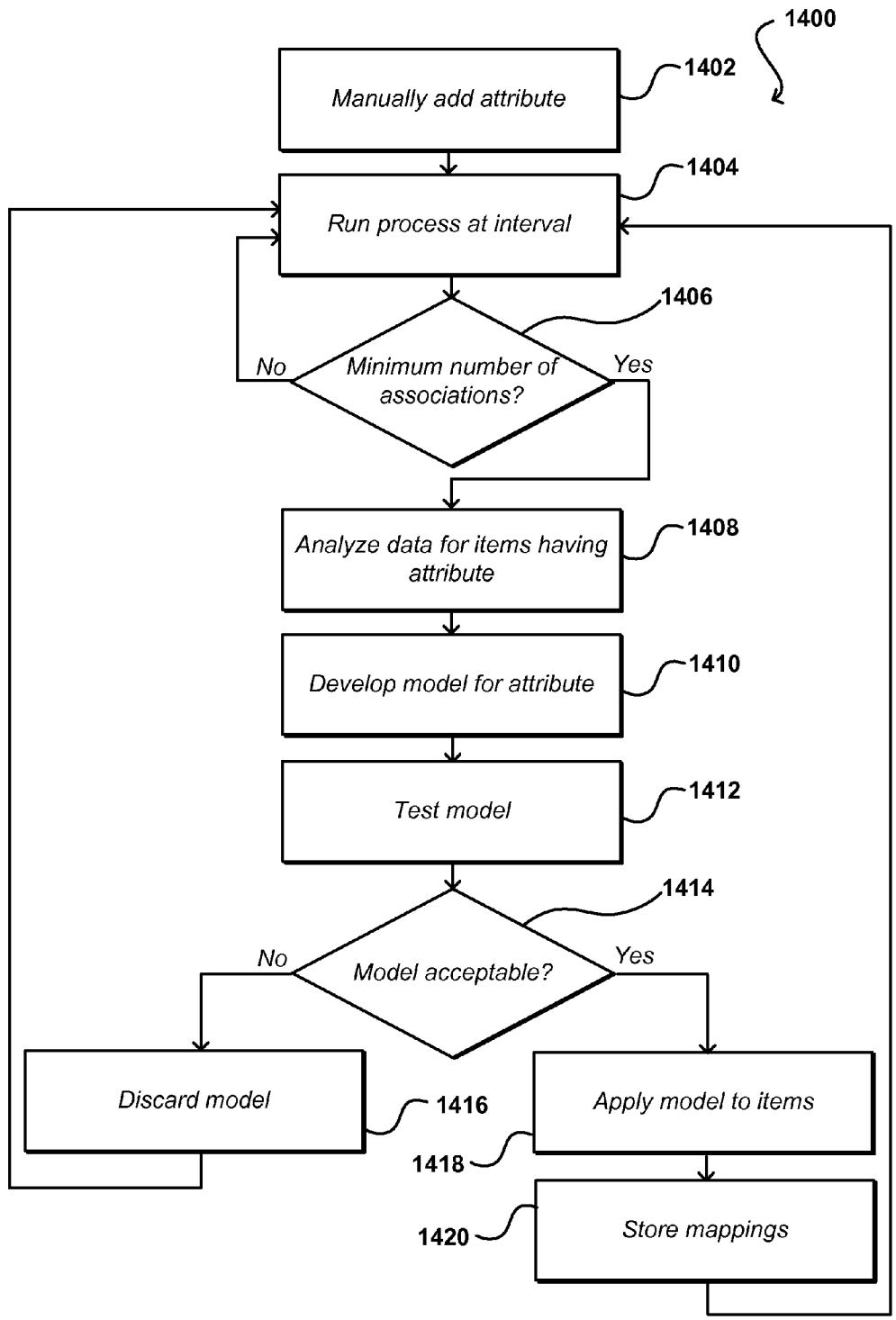
FIG. 14 illustrates an example process for automatically associating attributes with items that can be used in accordance with one embodiment.

FIG. 14 illustrates an example of a process 1400 for updating attributes associated with items that can be used in accordance with one embodiment. An initial set of associations can be determined and applied manually, such as by an authorized user 1402. Since it can be difficult to automatically determine relevant attributes based solely on information such as product descriptions and titles, and it can be impractical for a single authorized user to apply all manual attributes, it can be desirable to determine and submit predicted attributes to a system or service that can obtain human analysis of the prediction. As known in the art, workers for human intelligence task-based systems can receive a task such as a list of possible attributes for an item, and can respond with which attributes are believed to be relevant to the item and which are not believed to be relevant. By aggregating results from a number of users, it can be determined whether the average user is likely to think an attribute is related or not, such as by setting a minimum relatedness threshold for the aggregated results. If so, the attribute can be added to the item. If a new attribute is to be applied to several items, or new items are to receive attributes, an authorized user (or human intelligence based service) can manually provide enough associations that machine-learning or other such algorithms can propagate the attributes based at least in part upon the manually applied information.

At a specified time, such as at a regular interval, one or more algorithms can analyze the information for the items and the various attributes 1404. Information analyzed for the various items can include information such as item descriptions, titles, third party reviews, and item specifications, for example. The information also can include information pertaining to similar items, based on at least one similar attribute or aspect. A determination can be made for an attribute whether there are enough data points (e.g., mappings or associations) to attempt to build a model for the attribute 1406. As discussed, this can be a specified number, such as at least five associations. If not, no analysis is performed and the attribute can be analyzed again at a subsequent interval. If there is a sufficient number of data points, the information and attributes can be analyzed using one or more algorithms to attempt to determine likely associations between the attribute and various items, such as each item in a category or catalog 1408. A model can be built for the attribute using the information and at least one machine-learning or classification algorithm 1410, which can be tested against at least a portion of the data set 1412. If the model does not perform with at least a minimum level of accuracy, the model can be discarded 1416 and another attempt can be made at the next process interval. If the model does perform with at least the minimum level of accuracy, the model can be applied to items in a category, catalog, or other such grouping 1418, and the mappings of attribute to item can be stored to a data store 1420 or other such location for subsequent retrieval.

Various classification and/or machine-learning algorithms can be used in such a process within the scope of various embodiments. One embodiment utilizes a voted perceptron algorithm, although other machine-learning and/or classification algorithms such as a naïve-Bayes classification algorithm, support vector machine (SVM), maximum entropy classifier, decision tree, or logistic regression analysis, can be used in various embodiments. Data for every item can be gathered from sources such as catalog data, customer reviews, tag communities (or other communities or groups associated with the item), category classification or browse node, and third party sources. This data can be associated with each respective item, and can used to build a statistical model for each attribute using the voted perceptron algorithm or other classification algorithm or process. For example, the algorithm can attempt to associate various pieces of the data with a particular attribute associated with, or not associated with, a particular item. If for example a camera has the word "MegaShot" in the title, and the camera has the attribute "picture quality" associated therewith, then a statistical model for the attribute "picture quality" can include tokens such as "item_type=camera" and "item_title=MegaShot. In some models, these will each get a score, and each time an item with MegaShot has the picture quality attribute applied, the score can be increased due to the additional association as being more indicative of the attribute being relevant. Some algorithms will not adjust the score or weighting of an attribute association in the model unless there is an instance where the association was determined to be incorrect. If, for example, the "picture quality" attribute is determined not to be relevant to an item with "MegaShot" in the title, then this occurrence can decrease the association score in the model, as having "MegaShot" in the title is not, by itself, indicative of the attribute being applicable. The weighting or score adjustment can depend at least in part upon the number of data points or associations. If there are ten data points and only six of them are found to be valid associations for an attribute, then the score might get decreased substantially. If, however, there are a thousand data points and four are found to be invalid associations, then the score might decrease very little, if at all, depending on the level of significance and/or algorithm used. Thus, in some embodiments when an item is labeled with an attribute, scores for aspects of that item can be increased in the attribute model. If an item is not labeled with an attribute, then scores for aspects of that item can be decreased in the attribute model. When performed iteratively, items and associations that are highly predictive will end up with relatively high scores, and items and associations that are not highly predictive, or that are highly predictive to not be associated, can receive relatively low or even negative scores. For example, if an aspect of an item is predictive of an attributed not applying, then the aspect can actually obtain a negative score in the model. In some models, an aspect having a value around zero can imply that the attribute is not predictive either way as to the attribute applying.

Various embodiments do not attempt to build a model for any attribute labeled fewer than a specified number of times, such as for five items, as there may not be enough statistical significance for any association based on fewer data points. Further, once a model is built the model can be evaluated before being applied. If a model performs well, or with a minimum determined accuracy, the model can be used. If the model does not perform well, or under a specified accuracy level, the model can be rejected. In some cases, models can be kept for a period of time before being applied or discarded in an attempt to adjust the model based on additional data points. In other cases, each model that does not meet a minimum level of accuracy is rejected, and a new model generated in subsequent attempts. In some embodiments models are evaluated using a process such as ten fold cross-validation, or any other appropriate k-fold cross-validation or equivalent process. For ten fold cross-validation, a set of items is divided into ten sets, and ten models are created for each attribute. Each model is only trained on nine of the sets of data. The tenth set of data can be used to test each model, and the results can be aggregated or otherwise combined for each of the ten models to select an appropriate model to use for the attribute. In some cases, an iterative process can be used where a model can be selected, and can be further trained and tested using such a process.

In order to improve the results as well as the speed of the process, at least some pre-processing of the information associated with each item can be performed. For example, words from a stop list (e.g., the, and, or) can be removed from text extracted from a title or description of an item, as well as converting all text to lower case. Further, characters such as numbers and other non-alphabetic characters can be removed or converted to a specified character or space. Words also can be "stemmed", such that variations of a word can function as the same word for purposes of the model (e.g., "run" and "running" can both be stemmed to "run" for purposes of analysis). For blocks of text such as descriptions or reviews, book contents, product manuals, etc., statistical analysis can be performed on the words that are most relevant to the item. One such process is term frequency—inverse document frequency ("TF-IDF"), where words that are common in text for an item with a specific attribute but not common in text for items without that attribute can be determined to be indicative of that attribute. Processes such as TF-IDF may not be applied to data such as authors, producing companies, subject strings, or keywords of a the category related to the product, wherein each (non-stop listed) word may be considered to be an important word for purposes of analysis. Other types of analysis can be used to attempt to determine topics within free text, such as latent semantic analysis or latent Dirichlet allocation, or any extensions such as multi-grain latent Dirichlet allocation (MGLDA).

As discussed, approaches in accordance with various embodiments can be configured to periodically pull and analyze the data at set intervals, such as once a day or once a week. In other embodiments, data might be analyzed once a minimum number of new items, attributes, and/or information is available for analysis. The analysis can be used to update mappings or associations stored to a data store or other such location, which can be accessed by a structured ratings system or service in order to provide ratings and/or other such information along with specific content requested by a user, application, etc. In some cases, attributes that are manually associated with an item can be flagged or otherwise stored differently than items with automatic associations. In this way, manually attached attributes may not be removed by a model in various embodiments. In other embodiments, these attributes can be flagged for review before being removed. For example, even when an attribute is associated with an item at one point in time, that attribute may no longer apply at a later point in time. If an algorithm detects this and determines the attribute should be removed, the attribute can be flagged for review before automatic removal, as the algorithm might not have made a proper decision for this item, and manually added attributes can be held to a higher standard for removal than automatically added attributes. In some embodiments, the manually associated attributes are used for training the models, or are at least weighted more heavily than automatically associated attributes.

Such a process can be used not only to determine attributes for new items, or to add existing attributes to existing items, but also to seed new attributes to existing items. For example, a new protocol might become used commercially to a point such that users want to know if items are compatible with the new protocol. In other cases, users might enter new attributes as discussed above, and the system can attempt to associate any new attribute appearing a minimum number of times with any other appropriate item. In various embodiments, an authorized user can associate an attribute for the protocol to a minimum number of items such that a model will be built for the attribute on the next process interval. When the process runs, the information for the items with the manual associations will be analyzed by the algorithm(s), and a model will be built for the attribute. If the model performs acceptably well, the model can be used to apply that attribute to any item having the relevant criteria or aspects. In this way, the use of a couple manual associations can be used to seed the entire catalog such that the attribute can automatically be applied to any (determined) appropriate item.

In some cases, an attribute may become less relevant over time. For example, whether an antenna picks up "over the air" analog television signals may no longer be relevant as television signals are now transmitted digitally. As such, certain time limits can be applied to various associations. For example, if an attribute has not been rated for any item for a period of time, the attribute can be removed from the system, or from at least a portion of the items. The removal process can continue iteratively until either the attribute is again applied to various items or the attributes are removed from all items. In other cases, the weighting of each association can decay over time, such that the relevance of associate can decrease if there are no additional ratings or associations of an attribute. In some embodiments, attributes can be ranked according to a determined relevance score, such as the level of certainty that the attribute is relevant to the item as determined by one of the algorithms discussed herein. The relevance levels can be set to decay, and the removal of associations of an attribute can cause the score of the attributes to decrease for certain aspects, such that attributes can drop down in the rankings. In some cases, if an attribute does not have at least a minimum ranking or relevance, the attribute can be automatically removed. Various other approaches can be used to phase out attributes that are no longer of importance to users, providers, etc.

Figure 15:
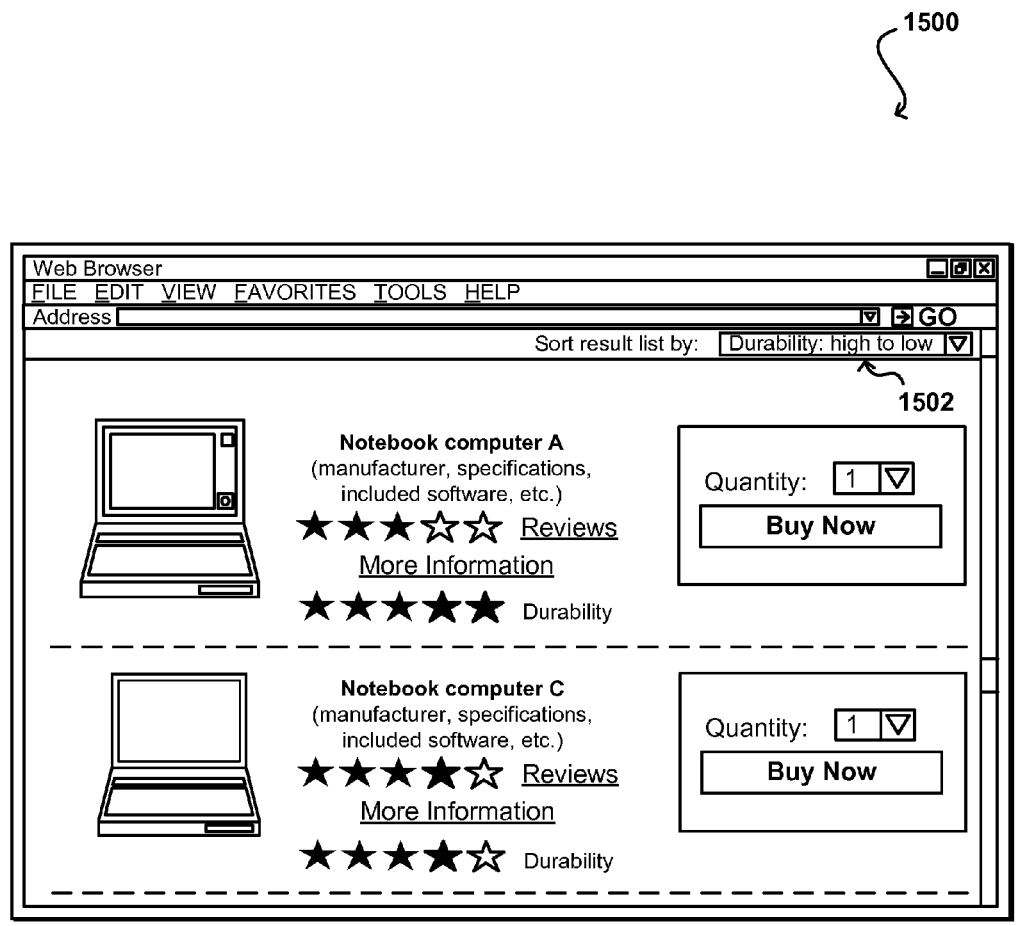
FIG. 15 illustrates an example interface allowing a user to sort by attribute that can be used in accordance with one embodiment.

Various other uses for attributes can be adopted in accordance with various embodiments. For example, FIG. 15 illustrates an example 1500 wherein a user receiving a results page in response to a query can select an option 1502 to sort the results by attribute, such as by increasing or decreasing rating. In this example, the user has selected to sort the results by durability rating, here from high to low. As can be seen, the rating for the selected attribute, here durability, is shown for each item in order to provide additional information that can be of use to the user. In some embodiments, the display also can be updated to include contextual information for the rating for the attribute for each item, such as from the top review or an expert review for each item.

While various processes herein are described to correlate attributes with aspects of various products, it should be understood that such techniques can be used to correlate specific information with any type of categorical data that can be classified and/or correlated. In an electronic marketplace embodiment, this can include correlating tags or relevant keywords to various items or categories, for example.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A non-transitory computer readable storage medium including instructions that, when executed by a processor, cause the processor to perform operations comprising:
   identifying a reviewable attribute of a first item as being configured to receive a review from a user, the reviewable attribute including a placeholder element for receiving attribute review text associated with the reviewable attribute of the first item;
   storing the attribute review text associated with the reviewable attribute of the first item for subsequent display with the first item;
   analyzing the reviewable attribute associated with the first item;
   analyzing information relating to the first item to create a model for the reviewable attribute, the model configured to associate the reviewable attribute with at least a second item such that the second item is configured with a second placeholder element;
   when it is determined that the reviewable attribute is to be associated with the second item, storing the association of the reviewable attribute and the second item to enable the second placeholder element; and
   in response to a request from the user to review the second item, providing for display at least the second placeholder element based at least in part on the stored association, the second placeholder element configured to enable the user to supply a review for the reviewable attribute.

2. The non-transitory computer-readable storage medium according to claim 1, wherein the model is performed with at least a minimum level of accuracy and is applied periodically to a plurality of items that includes at least the first item or the second item, and wherein new items and new attributes can be associated using new or existing models at various points in time.

3. The non-transitory computer-readable storage medium according to claim 1, wherein the model is applied at least in response to identifying that there is at least a minimum number of data points to be used in determining the association.

4. A computer-implemented method, comprising:
   identifying a reviewable attribute of a first item, the reviewable attribute including a placeholder for receiving text associated with the reviewable attribute associated with the first item;
   determining, based at least in part on a model applied to at least a second item, whether the second item is to be associated with the reviewable attribute, the model configured to associate the reviewable attribute with at least the second item such that the second item is configured with a second placeholder;
   when it is determined that the second item is to be associated with the reviewable attribute, associating the reviewable attribute with the second item to enable the second placeholder; and
   providing at least the second placeholder based at least in part on the association, the second placeholder configured to enable a user to submit a review for the reviewable attribute associated with the second item.

5. The computer-implemented method of claim 4, wherein the user is enabled to at least view or provide a rating for the reviewable attribute associated with any of a plurality of items including at least the first item or the second item.

6. The computer-implemented method of claim 4, further comprising submitting one or more mappings of at least one reviewable attribute associated with at least one of a plurality of items including at least the first item or the second item to a structured ratings system for access by the user.

7. The computer-implemented method of claim 4, wherein at least a portion of a group of reviewable attributes were manually associated with at least a portion of a plurality of items including at least the first item or the second item.

8. The computer-implemented method of claim 4, wherein at least a portion of a group of reviewable attributes were associated with at least a portion a plurality of items including at least the first item or the second item using a human intelligence task-based system.

9. The computer-implemented method of claim 4, wherein at least a portion of the model is applied iteratively to at least a portion of a plurality of items including at least the first item or the second item.

10. The computer-implemented method of claim 4, wherein the model is built using at least one classification algorithm.

11. The computer-implemented method of claim 10, wherein the classification algorithm is one of a voted perceptron algorithm, naïve-Bayes classification algorithm, support vector machine (SVM), maximum entropy classification algorithm, decision tree algorithm, or logistic regression algorithm.

12. The computer-implemented method of claim 4, wherein the information includes at least one of review information, item description information, item title information, author information, manufacturer information, origin information, manual information, or information relating to additional items similar to the first item or the second item.

13. The computer-implemented method of claim 4, further comprising testing the model for the reviewable attribute before applying the model to at least a portion of a plurality of items including at least the first item or the second item.

14. The computer-implemented method of claim 13, wherein the model is tested using a k-fold cross-validation process.

15. The computer-implemented method of claim 13, further comprising discarding the model when the model does not predict attribute association at or above a threshold level of accuracy.

16. The computer-implemented method of claim 4, wherein the model is created at least by building the model using second information that is indicative of the first item being associated with a first attribute as well as third information that is indicative of the first item not being associated with a second attribute.

17. The computer-implemented method of claim 4, further comprising applying at least one of a time limit or a decay to the association of the first item with the reviewable attribute, wherein the association is capable of expiring after a period of inactivity.

18. A system, comprising:
   a processor; and
   a memory device including instructions that, when executed by the processor, cause the processor to:
      identify a reviewable attribute of a first item, the reviewable attribute including a placeholder element for receiving review text associated with the reviewable attribute of the first item;
      determine, based at least in part on a model applied to at least a second item, whether the second item is to be associated with the reviewable attribute, the model configured to associate the reviewable attribute with at least the second item such that the second item is configured with a second placeholder;

associate the reviewable attribute with the second item to enable the second placeholder when it is determined that the second item is to be associated with the reviewable attribute; and provide at least the second placeholder based at least in part on the association, the second placeholder configured to enable a user to submit a review for the reviewable attribute associated with the second item.

19. The system of claim 18, wherein at least a portion of a group of reviewable attributes are manually associated with at least a portion of a plurality of items including at least the first item or the second item using at least one of a manual process or a human intelligence task-based system.

20. The system of claim 19, wherein the model is applied if there is a least a minimum number of data points to be used in determining the association.

\* \* \* \* \*